United States Patent [19]
Yao

[11] 4,262,996
[45] Apr. 21, 1981

[54] CHIRP-GRATING LENS FOR GUIDED-WAVE OPTICS

[75] Inventor: Shi-Kay Yao, Anaheim, Calif.

[73] Assignee: Rockwell International Corporation, El Segundo, Calif.

[21] Appl. No.: 43,289

[22] Filed: May 29, 1979

[51] Int. Cl.³ ............................................. G02B 5/14
[52] U.S. Cl. ........................... 350/96.19; 350/162 R
[58] Field of Search .............. 350/96.12, 96.14, 96.19, 350/162 R, 162 SF, 162 ZP

[56] References Cited
U.S. PATENT DOCUMENTS

| | | | |
|---|---|---|---|
| 3,617,109 | 11/1971 | Tien | 350/96.14 |
| 3,674,335 | 7/1972 | Ashkin et al. | 350/96.19 |
| 3,674,336 | 7/1972 | Kogelnik | 350/96.19 |
| 3,814,498 | 6/1974 | Tomlinson et al. | 350/96.19 |
| 3,982,810 | 9/1976 | Tamir et al. | 350/96.19 |
| 4,111,524 | 9/1978 | Tomlinson | 350/96.19 |
| 4,146,298 | 3/1979 | Szczepanek | 350/96.15 |

OTHER PUBLICATIONS

A. Katzir et al., "Chirped Gratings in Integrated Optics" *IEEE Jour. Quantum Elect.* vol. QE 13, No. 4 Apr. 1977.
P. R. Ashley et al., "Fresnal Lens in Thin Film Waveguides" *Topical Meeting on Integrated Guided Wave Optics*, Tech. Digest., Salt Lake City, 1978.
L. D. Dickson, "Optical Considerations for an Acoustooptic Deflector", *Applied Optics*, vol. 11, No. 10, Oct. 1972.
S. K. Yao et al., "Acousto-Optical Multiplexer for Fiber Optical Systems" *IEEE Proceedings of Ultrasonics Symposium*, Annapolis, MD. 1976, pp. 214–217.
G. I. Hatakoshi et al. "Grating Lenses for Integrated Optics" *Optics Letters*, vol. 2, No. 6, Jun. 1978, pp. 142–144.
S. K. Yao et al., "Chirp-Grating Lens for Guided-Wave Optics" Applied Physics Letts. 33(7), Oct. 1978, pp. 635–637.

*Primary Examiner*—Stewart J. Levy
*Attorney, Agent, or Firm*—H. Fredrick Hamann; Gilbert H. Friedman

[57] ABSTRACT

A high-throughput diffraction-limited Bragg diffraction grating having a variable periodicity functions as a lens for optical guided waves. The lens may be fabricated with planar photolithographic techniques. It has predictable focusing properties which are insensitive to process variations making it particularly useful for mass production of integrated optical systems.

5 Claims, 1 Drawing Figure

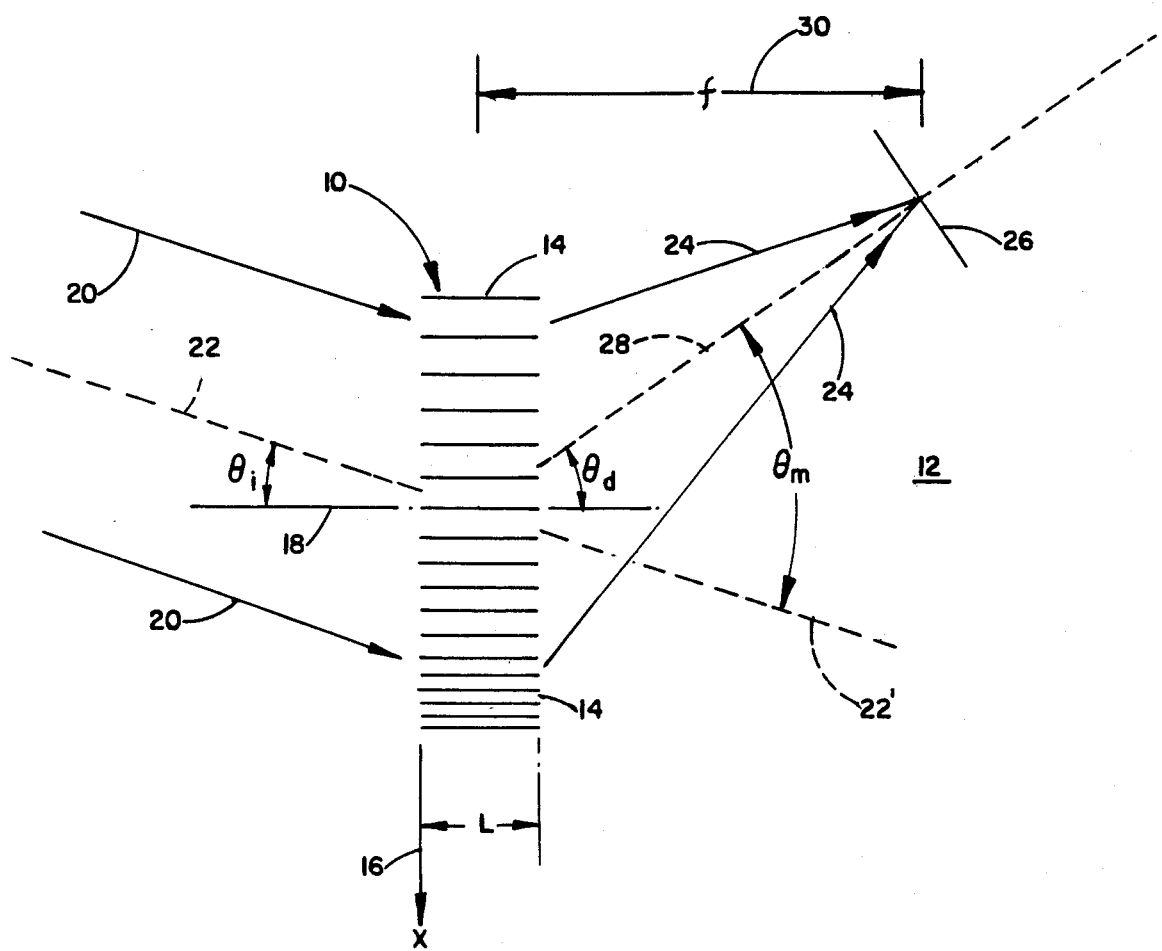

CHIRP-GRATING LENS FOR GUIDED-WAVE OPTICS

BACKGROUND OF THE INVENTION

This invention relates to devices for integrated optics and, more particularly, to thin-film optical devices employing a grating structure as a lens.

Considerable effort has been devoted to improving the quality of guided-wave optical lenses. The following references disclose much of this effort. S. K. Yao and D. B. Anderson, "Shadow Sputtered Diffraction-Limited Waveguide Luneburg Lenses", Appl. Phys. Lett. 33, 307–309, (1978). W. H. Southwell, "Geodesic Optical Waveguide Lens Analysis", J. Opt. Soc. Am. 67, 1293–1299 (1977). V. E. Wood, "Effects of Edge-Rounding on Geodesic Lenses", Appl. Opt. 15, 2817–2820 (1976). C. M. Verber, D. W. Vahey, and V. E. Wood, "Focal Properties of Geodesic Waveguide Lenses", Appl. Phys. Lett. 28, 514–516 (1976). E. Spiller and J. S. Harper, "High Resolution Lenses for Optical Waveguides", Appl. Opt. 13, 2105–2108 (1974). D. B. Anderson, R. L. Davis, J. T. Boyd and R. R. August, "Comparison of Optical Waveguide Lens Technologies", IEEE J. Quantum Electron., QE-13, 275–282 (1977). D. B. Anderson and R. R. August, "Progress in Waveguide Lenses for Integrated Optics", Trans. IECE Japan E61, 140–143 (1978). D. Kassai, B. Chen, E. Marom, O. G. Ramar, and M. K. Barnoski, "Aberration Corrected Geodesic Lens for Integrated Optics Circuits", Topical Meeting on Integrated and Guided Wave Optics, Tech. Dig., Salt Lake City, 1978. P. K. Tien, "Methods of Forming Novel Curved-Line Gratings and Their Use as Reflectors in Integrated Optics", Opt. Lett. 1, 64–66 (1977). P. R. Ashley and W. S. C. Chang, "Fresnel Lens in Thin Film Waveguides", Topical Meeting on Integrated and Guided Wave Optics, Tech. Dig., Salt Lake City, 1978. As a result of this work, diffraction-limited guided-wave optical lenses have been constructed using a semiplanar technology for thin-film Luneburg lenses. In this connection, refer particularly to the work of Yao et al listed above. Bulk optics technology has been used to construct geodesic lenses. However, the topical alignment of both Luneburg lenses and geodesic lenses is difficult because the alignment procedure requires the positioning of tools. Another barrier to the use of Luneburg and geodesic lenses arises because their focusing properties vary as a result of variations in the process by which they are fabricated. As another disadvantage of the Luneburg lens, they require the use of a film having a higher index of refraction than that of the waveguide material. Thus, Luneburg lenses are limited to applications where the waveguide material has a relatively low index of refraction. Another disadvantage of the geodesic lenses is that they require aberration correction.

Some of the difficulties and disadvantages of Luneburg and geodesic lenses have been overcome by employing photolithographic and electron-lithographic techniques to construct a new family of planar grating lenses for guided-wave optics. The new family of lenses includes curved grating reflectors, Fresnel zone phase plates, and Fresnel Bragg deflector lenses. Curved grating reflectors are discussed in the paper by P. K. Tien listed above. Fresnel zone phase plates are discussed in the paper by P. R. Ashley et al listed above. Fresnel Bragg deflector lenses are discussed by G. I. Hatakoshi and S. I. Tanaka in "Grating Lenses for Integrated Optics", Optics Letters, June 1978, Volume 2, No. 6, pp. 142–144. The grating lens disclosed by Hatakoshi et al has a non-uniform periodicity which varies parabolically in a symmetrical fashion about the center of the grating. The grating lines or elements are all rotated or tilted with respect to each other. The latter feature has the disadvantage of making the lens difficult to manufacture by digital computer techniques. In addition, the focus of the grating lens of Hatakashi et al is positioned in the through beam of the grating. The through beam of a grating is the zero order beam transmitted through the grating in line with the incident beam. This feature has the disadvantage of focusing the information power at a point where the noise power is relatively high.

Some of the characteristics which are desired for lenses are high throughput, low spurious noise, i.e., low side lobes, and diffraction-limited performance. Thus far, experimental results obtained using the lithographically produced types of lenses listed above have been disappointing. Good quality curved grating reflectors are difficult to make because of the small radius of the grating lines. Scanning electron beams and other digitally controlled pattern generators are awkward to use in making the curved grating lines. Good focusing properties have been obtained in Fresnel zone phase plate lenses. However, the Fresnel lens inherently has many focal points, all of them lying along the optical axis. Thus, the other focal orders constitute a noise background for the desired focal order. The performance results published thus far for the Fresnel Bragg deflector lens are not particularly good. This is probably due to the difficulties encountered in generating rotated or tilted grating elements and other experimental imperfections. In addition, for this lens also, the focal points all lie along the optical axis increasing the noise background for the desired focal order.

Acousto-optic Bragg beam deflectors, wherein the waveform of a bulk acoustic wave results from a linear chirp, i.e., a linear variation in frequency, have been used to focus the energy of optical beams to a moving focal spot. Acousto-optic beam deflectors and their focusing effect are discussed in the following references: E. I. Gordon, "A Review of Acoustooptical Deflection and Modulation Devices", Proc. IEEE, 54, p. 1391, 1966; J. R. Boyd, E. H. Young, and S. K. Yao, "Design Procedure for Wide Bandwidth Acousto-Optic Modulator", Opt. Eng. 16, 452–454 (1977); S. K. Yao and E. H. Young, "Acousto-Optical Multiplexer for Fiber Optical Systems", IEEE Proc. of Ultrasonics Symposium, Annapolis, Md., 1976, pp 214–217; and L. D. Dickson, "Optical Considerations for an Acoustooptic Deflector", Appl. Opt. 11, 2196–2202 (1972). Of course, the movement of the focal spot produced by acousto-optic beam deflectors makes these devices impractical for those integrated optics applications which require a fixed or stationary lens.

SUMMARY OF THE INVENTION

An object of the present invention is the provision of a stationary planar lens for thin-film optical waveguides which may be fabricated using photolithographic or electron-lithographic techniques.

Another object is to provide a stationary planar lens for thin-film optical waveguides having focusing properties which are insensitive to small variations in the process by which they are made.

A further object of the invention is to provide a planar lens for thin-film optical waveguides for which the optical alignment of a plurality of optical components is relatively easy.

Still another object of the invention is to provide a stationary planar lens for thin-film optical waveguides wherein the lens has high throughput.

A still further object of the invention is to provide a planar lens for thin-film optical waveguides wherein the lens has low side lobes.

Still another object of the invention is to provide a planar lens for thin-film optical waveguides wherein the lens provides an output having low spurious noise background.

Another object of the invention is to provide a planar lens for thin-film optical waveguides which do not require aberration correction.

Still another object of the invention is to provide a planar lens for thin-film optical waveguides wherein the lens provides an undistorted diffraction-limited focus.

An additional object of the invention is to provide a planar lens for thin-film optical waveguides wherein the lens has aperture apodization capability so that amplitude weighting over the optical wavefront can be easily achieved.

According to the present invention, these and other objects are attained by a Bragg diffraction grating in a thin-film optical waveguide wherein the grating lines or elements are all parallel to each other. The spacing between the grating elements has a variable periodicity which is derived from the Bragg relationship and the ideal focusing condition as discussed further hereinafter. This variation in periodicity is an approximately linear chirp. The lens thus formed is particularly well-suited to fabrication by mass production techniques. Since lithographic techniques may be used, precision reproducibility and low cost production are made possible.

BRIEF DESCRIPTION OF THE DRAWING

The sole FIGURE is a sketch of a grating lens according to the invention.

DETAILED DESCRIPTION OF THE PREFERRED EMBODIMENT

Referring now to the FIGURE, there is shown a representation of an optical grating 10 formed as part of a thin-film optical waveguide 12. The grating 10 is a region of the optical waveguide 12 wherein the effective waveguide-mode index of refraction is perturbed or modulated. In the preferred embodiment, this modulation may be accomplished on the surface of the optical waveguide 12 by corrugation or etching, by overlay, or by diffusion of dopants into the material of the optical waveguide 12.

Bragg grating deflectors which can efficiently deflect an incident monochromatic optical beam to an angle determined by the grating periodicity when the angle of incidence of the beam satisfies the Bragg condition are well known in the art. These prior-art Bragg gratings have a uniform or constant periodicity.

The optical grating 10 of the present invention is a Bragg grating in which the spacing between the grating lines or elements 14 is a variable.

The gratings elements 14 are parallel to each other. Their periodicity is shown in the FIGURE as decreasing (frequency increasing) in the positive x direction along the axis of the grating 10 as indicated by the arrow 16. The variation of periodicity is assymetrical with respect to the transverse grating center line 18.

The interaction length of the grating 10 is designated by the symbol L in the FIGURE. As in a prior-art Bragg diffraction grating, the interaction length is made long enough that the grating 10 produces only one strongly diffracted beam of light when the angle of incidence of an incident beam is at or near the Bragg angle. Stated alternatively, the interaction length L satisfies the inequality of Expression (1).

$$L >> n\Lambda^2/\lambda \tag{1}$$

where n is the effective refractive index of the guided wave mode, $\Lambda$ is the periodicity of the grating 10, and $\lambda$ is the wavelength of the light in the incident beam.

An optical input beam, as represented by the arrows 20, is shown in the FIGURE as incident on the grating 10. A ray represented by dashed line 22 at the center or optical axis of the input beam 20 is at an incident angle of $\theta_i$ with respect to the transverse grating center line 18. The transverse grating center line is normal to the direction of the grating axis 16.

An output beam of order m, as represented by the arrows 24, is shown in the FIGURE coming to a focus at a focal plane 26. Center ray 22 of the input beam 20 is deflected by a deflection angle $\theta_m$ to propagate in the output beam 24 along the output beam optical axis represented by dashed line 28. Output beam optical axis 28 makes a diffraction or exit angle of $\theta_d$ with respect to the transverse grating center line 18. Focal plane 26 is perpendicular to output beam optical axis 28. The incident angle $\theta_i$ and diffraction angle $\theta_d$ are always acute angles. The deflection angle $\theta_m$ is equal to the sum of the incident angle $\theta_i$ and the diffraction angle $\theta_d$.

When the Bragg condition is satisfied, the equation of Expression (2) gives the relationship between the deflection angle $\theta_m$, the incident angle $\theta_i$, and the diffraction angle $\theta_d$.

$$\theta_m = 2 \arcsin \left( \frac{m\lambda}{2n\Lambda \cos[(\theta_i - \theta_d)/2]} \right) \tag{2}$$

where m is the spatial order of the diffracted output beam and the other items are as defined above. When the Bragg condition is precisely satisfied, the incident angle and the diffraction angle are both equal to the Bragg angle and are thus equal to each other. In this case, the deflection angle is equal to twice the Bragg angle.

For the case of a collimated input beam 20, the incident angle $\theta_i$ is constant over the aperture of the grating 10. For focusing, it is required, therefore, that the deflection angle $\theta_m$ and diffraction angle $\theta_d$ be variables over the aperture of the grating 10 also. Inspection of Expression (2) reveals that $\theta_m$ and $\theta_d$ can be caused to vary in a Bragg diffraction grating, when $\theta_i$ is held constant, by varying $\Lambda$, the periodicity, as a function of x. It is for this reason that a grating 10 in accordance with this invention has a variable periodicity as has been stated above. The desired ideal variation in periodicity is obtained by rearranging the equation of Expression (2) to form the equation of Expression (3) wherein $\Lambda(x)$, $\theta_m(x)$, and $\theta_d(x)$ are expressed as variables across the aperture of the grating 10.

$$\Lambda(x) = m\lambda/2n \sin[\tfrac{1}{2}\theta_m(x)]\cos\{[\theta_i - \theta_d(x)]/2\}. \tag{3}$$

For ideal focusing, the diffraction angle $\theta_d(x)$ must be proportional to arc tan (x/f) where f is the focal length as indicated at 30. When this ideal focusing condition is combined with Expression (3), the variation of periodicity required for a grating 10 in accord with this invention is defined. This variation is approximately linear. With the grating periodicity conforming to Expression (3) and with $\theta_d(x)$ conforming to the ideal focusing condition, all of the optical rays deflected by the grating lens will merge at the same focal point without aberration. The result is a lens 10 having a focal distribution of diffraction limited width and a low side lobe level. Because the focal length 30 of a grating 10 in accordance with this invention depends only on the grating geometry, as can be seen by inspection of the FIGURE and Expression (3), the focal length 30 is insensitive to fabrication process variations. The focal lengths of gratings made in accord with the invention are therefore highly predictable.

As shown in the FIGURE, the Bragg diffraction grating output beam optical axis 28 is deflected by the deflection angle $\theta_m$ from the direction of the input beam 22 and, of course, from the through beam 22' transmitted through the grating 10 in line with the input beam 22. The information brought to a focus at the focal plane 26 is thus positioned outside the through beam 22'. Noise due to variation in the grating lens efficiency remains in the transmitted through beam 22'. The result is an improvement in the signal-to-noise ratio at the focal plane 26.

Other geometrical parameters of the optical grating 10 are controlled, in the preferred embodiment, to maximize the efficiency or throughout of the lens. These include modulation depth, where the effective mode index of refraction variation is modulated by surface overlay or corrugation, and interaction length. Variation of modulation depth and small variations in interaction length do not significantly affect the focal properties of the lens.

As is well known, the efficiency of a Bragg diffraction grating at the Bragg alignment condition is at a maximum if the phase retardation difference is equal to $\pi$. The phase retardation is given by the product of the magnitude of the modulation or perturbation of the effective waveguide mode index of refraction, n', the wave constant, k, and the interaction length, L, of the grating. $k=2\pi/\lambda$. This condition for maximum efficiency is set forth in Expression (4).

$$kn'l = \pi. \tag{4}$$

Where the index of refraction modulation occurs by surface corrugation or overlay, as in the preferred embodiment, n' is a function of the variation in waveguide thickness produced by the modulation of the waveguide surface only. In the preferred embodiment then, the waveguide surface modulation is controlled so that the equation of Expression (4) is substantially satisfied. This control serves to insure high throughput for the optical grating 10.

The other geometrical parameter which affects the efficiency of a grating lens in accord with the invention without significantly affecting the focal properties is the interaction length L. L is chosen after a grating periodicity variation is selected. Selection of an appropriate value of interaction length, subject to the condition of Expression (1), will tend to maximize efficiency and throughout of the lens. This is shown in the following analysis.

As is well known, the efficiency of a Bragg diffraction grating having a constant periodicity is given by the equation of Expression (5).

$$P_1/P_o = \frac{\sin^2\pi[(n'L/2\lambda)^2 + (L\Delta/\Lambda)^2]^{\frac{1}{2}}}{1 + [2\lambda\Delta/n'\Lambda]^2} \tag{5}$$

where $P_o$ is the total optical input power incident on a constant or uniform periodicity grating at an incident angle which differs from the Bragg angle by a mismatch angle $\Delta$, and where $P_1$ is the optical power deflected to the output beam which is at an angular displacement of twice the Bragg angle from the incident beam.

The first term in the brackets in the numerator of the fraction on the right hand side of the equation in Expression (5) is $(n'42\lambda)^2$. It is apparent that the efficiency approaches an absolute maximum when this first term is equal to 0.5 and when the mismatch angle $\Delta$ is zero. It is also apparent that the efficiency approaches a lesser maximum for any other selected value of the first term when the mismatch angle $\Delta$ is zero. Regardless of the value of the first term, an increase in the mismatch angle decreases efficiency. A rule of thumb in grating device design, therefore, is to keep the mismatch angle $\Delta$ less than approximately $0.44(\Lambda/L)$ so that the second term in the brackets in the numerator of the fraction on the right hand side of the equation in Expression (5) is kept less than about 0.19. Following the rule-of-thumb tends to prevent the grating efficiency from falling below its maximum value by more than about 50%.

For a chirp grating lens 10 according to the invention, the grating periodicity $\Lambda(x)$ varies according to the combination of the equation of Expression (3) and the ideal focusing condition. The most common applications of such a lens are focusing and collimating although refocusing of an arbitrary beam is a frequent application. In the most common applications, since either the incident beam or the output beam is collimated, a variable Bragg condition over the entire aperture of a grating lens 10 in accord with the invention cannot be satisfied inasmuch as all the grating lines or elements are parallel. Therefore, the angular mismatch $\Delta$ is a variable $\Delta(x)$. Optimal alignment between the incident optical beam and the grating lens 10 occurs by minimizing $\Delta(x)$ over the aperture of the grating 10. One approach to optimal alignment is to cause the incident angle $\Lambda_i$ to equal the Bragg angle most closely at or near the transverse grating center line 18. In this case, the magnitude of the angular mismatch at the extreme of the grating is approximately equal to $\frac{1}{4}$F where F is F-number, the ratio of the focal length to the aperture of the grating lens 10. Combining this angular mismatch with the rule-of-thumb stated above a design criterion for interaction length over the entire grating lens entrance aperture is obtained as given in the inequality of Expression (6).

$$l \leq 0.44[4f\Lambda(x)]. \tag{6}$$

A more detailed analysis provides a design criterion which equalizes the normalized angular mismatch $(L\Delta/\Lambda)$ at the two extremities of the grating lens aperture. For a grating for which the periodicity varies by about a factor or two, this design criterion is given in the inequality of Expression (7).

$$1 \leq 5.4n\Lambda_m^2/\lambda \qquad (7)$$

where $\Lambda_m$ is the grating periodicity at the end of the grating 10 wherein the grating lines or elements are most closely spaced.

The F-number of the grating lens 10 can be described by the following approximation:

$$F \simeq \frac{n(\Lambda_1\Lambda_2)}{\lambda(\Lambda_1 - \Lambda_2)} \qquad (8)$$

where $\Lambda_1$ and $\Lambda_2$ are the grating periodicities at the extremities of the grating lens aperture.

In the preferred embodiment of this invention, the grating lens 10 is designed to have an interaction length (grating line or element width) conforming to the criteria of Expression (1) in order to have relatively high efficiency of power transfer to the focused beam. The preferred grating lens 10 may also be designed to have an interaction length conforming to the criteria of Expression (6) or (7) in order to keep the power transfer efficiency uniform over the grating lens aperture.

The fabrication of an optical grating 10 in accord with the invention may be accomplished by using techniques which are well known to those skilled in the art. Masks may be fabricated using a digital computer controlled mask generator program, for example, or a holographic grating recording, as another example. Fabrication of the grating on the desired substrate may be accomplished by operation of pattern generator means directly on the substrate or indirectly by operation of the pattern generator means to form a lithographic mask. In the latter case, the mask is used to reproduce the pattern image on photosensitive or electron sensitive resists on the desired substrate surface. The grating may be formed (1) by depositing overlay films on an optical waveguide, (2) by etching (chemical, plasma, ion beam, etc.) of the previously formed waveguide, or (3) by diffusion of impurities into the waveguide material.

For an application which involves a plurality of guided wave optical components, the positioning of the several grating lens patterns may be generated according to calculated digital data using a pattern generator. Since the focal properties of grating lenses according to the invention are insensitive to variations in the fabrication process, the calculated alignment of the components will be maintained precisely. Thus, with photolithographic mask alignment procedures, no alignment trimming is required on the several optical components of a compound optical device in accord with the invention after the components are made.

In the embodiments described thus far, it has been assumed that it would ordinarily be preferred to have the power transfer efficiency, as set forth in Expression (5), be relatively uniform across the aperture of a grating lens 10. For this, the grating elements 14 of a lens 10 in accord with the invention are all preferably substantially identical in length.

However, uniformity is not always preferred. In some applications it is desired to have a variable weighting of the optical amplitude across the optical wavefront of the output beam. This effect, apodization, can be readily achieved in a grating lens 10 in accord with the invention by varying the interaction length L of the grating elements 14 across the aperture of the lens 10 so that the power transfer efficiency, as set forth in Expression (5), varies in a desired manner.

The invention, techniques for making it, and results obtained experimentally from a grating formed in accord with the invention are described in an article by Yao et al "Chirp-grating Lens for Guided-Wave Optics" Applied Physics Letters, 33 (7), Oct. 1, 1978. Said article is hereby incorporated by reference into this specification in its entirety.

While the invention has been described with respect to the preferred embodiment thereof, it will be understood by those skilled in the art that various changes in form and details may be made without departing from the spirit and scope of the invention.

What is claimed is:

1. The combination comprising:
   (a) A thin film optical waveguide; and
   (b) Bragg diffraction grating means for modulating the effective mode index of refraction of said waveguide wherein said grating means acts as a lens,
   (1) wherein said grating means comprises a plurality of grating elements disposed parallel to each other,
   (2) wherein the spacing between said grating elements has a variable periodicity,
   (3) wherein said variable periodicity conforms substantially to the relationship:

$$\Lambda(x) = m\lambda/2n \sin[\theta_m(x)/2]\cos\{[\theta_i - \theta_d(x)]/2\}$$

where
   x is displacement along the longitudinal axis of said grating,
   $\Lambda(x)$ is the periodicity,
   m is a selected diffraction order of an output beam for said lens,
   $\lambda$ is the wavelength of light desired to be diffracted,
   n is the effective refractive index of the guided wave mode,
   $\theta_m(x)$ is the angle of deflection for a ray incident near the Bragg angle on said grating at x where $\theta_m(x) = \theta_i + \theta_d(x)$,
   $\theta_i$ is the incident angle of said ray, and
   $\theta_d(x)$ is the diffraction angle of said ray where $\theta_d(x)$ is proportional to arc tan (x/f) and where f is a selected focal length for said lens, and
   (4) wherein the focal plane of said lens is positioned outside a through beam transmitted through said lens.

2. The combination recited in claim 1, wherein the product of the magnitude of the modulation of the effective index of refraction of said waveguide, the wave constant, and the interaction length of said grating is about equal to $\pi$.

3. The combination recited in claim 1, wherein said grating elements have a substantially identical interaction length, L, wherein L substantially satisfies the relationship:

$$L \leq 0.44[4F\Lambda(x)]$$

where F is the F-number of said lens.

4. The combination recited in claim 3 wherein said grating elements have a substantially identical interaction length, L, wherein L substantially satisfies the relationship:

$$L \leq 5.4 n \Lambda_m^2 / \lambda$$

wherein $\Lambda_m$ is the grating periodicity at that end of said grating wherein said grating elements are most closely spaced.

5. The combination recited in claim 1, wherein said grating elements have a variation in interaction length selected to weight the optical amplitude of an output beam across the optical wavefront thereof in a desired manner.

* * * * *

UNITED STATES PATENT AND TRADEMARK OFFICE
CERTIFICATE OF CORRECTION

PATENT NO. : 4,262,996
DATED : April 21, 1981
INVENTOR(S) : Shi-Kay Yao

It is certified that error appears in the above-identified patent and that said Letters Patent are hereby corrected as shown below:

Column 3, line 65, change [gratings] to read -- grating --.

Column 5, line 22, change [ofthe] to read -- of the --.

Column 6, line 1, change [throughout] to read -- throughput --; line 17, change $[(n^-42\lambda)^2]$ to read -- $(n^-L/2\lambda)^2$ --; line 50, change $[\Lambda_i]$ to read -- $\theta_i$ --; line 52, change [extreme] to read -- extremes --; line 56, after the word [above] insert -- , --; line 61, change the equation $[1 \leq 0.44[4f\Lambda(x)]]$ to read -- $L \leq 0.44[4f\Lambda(x)]$ --; and line 67, change [or] to read -- of --.

Column 7, line 2, change $[1 \leq 5.4n\Lambda_m^2/\lambda]$ to read -- $L \leq 5.4n\Lambda_m^2/\lambda$ --.

Signed and Sealed this

Twenty-first Day of July 1981

[SEAL]

Attest:

Attesting Officer

GERALD J. MOSSINGHOFF

Commissioner of Patents and Trademarks